United States Patent [19]

Weiner

[11] 4,225,278
[45] Sep. 30, 1980

[54] COIN AND KEY OPERATED STORAGE SYSTEM

[76] Inventor: George C. Weiner, 225 Garden St., Hoboken, N.J. 07030

[21] Appl. No.: 827,816

[22] Filed: Aug. 25, 1977

[51] Int. Cl.² .............................................. B65G 1/06
[52] U.S. Cl. .................................... 414/273; 414/267;
414/279; 414/281; 220/19; 194/1 R
[58] Field of Search ..................... 214/16.4 R, 16.4 A,
214/16.1 CC, 16.1 CD, 16.1 CE, 16.1 EA, 16.1
EB; 220/19, 252; 340/51; 194/1 R, 4 R, 9 T;
414/266–267, 273–275, 277–279, 281

[56] References Cited

U.S. PATENT DOCUMENTS

| 1,288,567 | 12/1918 | Hall | 214/16.1 EB |
|---|---|---|---|
| 1,626,009 | 4/1927 | Murray | 220/19 |
| 1,890,983 | 12/1932 | Griffith | 220/19 |
| 2,691,448 | 10/1954 | Lontz | 214/16.1 EB |
| 2,804,227 | 8/1957 | Elfgren | 220/19 X |
| 2,936,057 | 5/1960 | Alimanestiano et al. | 214/16.1 EB |
| 3,473,675 | 10/1969 | Goldammer et al. | 214/16.4 A |
| 3,756,433 | 9/1973 | Richins | 214/16.4 A |
| 3,786,956 | 1/1974 | Tabor | 150/1 |
| 3,933,231 | 1/1976 | Vinet | 340/51 |
| 3,964,577 | 6/1976 | Bengtsson | 214/16.4 A X |

FOREIGN PATENT DOCUMENTS 1146351 11/1957 France ....................................... 220/19
516918 2/1955 Italy ....................................... 214/16.4 A Primary Examiner—Stephen G. Kunin
Assistant Examiner—R. B. Johnson
Attorney, Agent, or Firm—Lee C. Robinson, Jr.

[57] ABSTRACT

An automated storage system includes a door at an access station for the insertion of articles, luggage and the like to be stored temporarily in a container. A transport system is provided to transport the container to a predetermined storage repository removed from the access station. Retrieval of the container is initiated by the insertion of a lock key in a predetermined position to activate the transport system to return the container to the access station when the user desires to retrieve the article or luggage from the system. The containers are constructed to be resistant to fragmentation in the event of an explosion and the containers are placed in an explosion confining environment.

5 Claims, 8 Drawing Figures

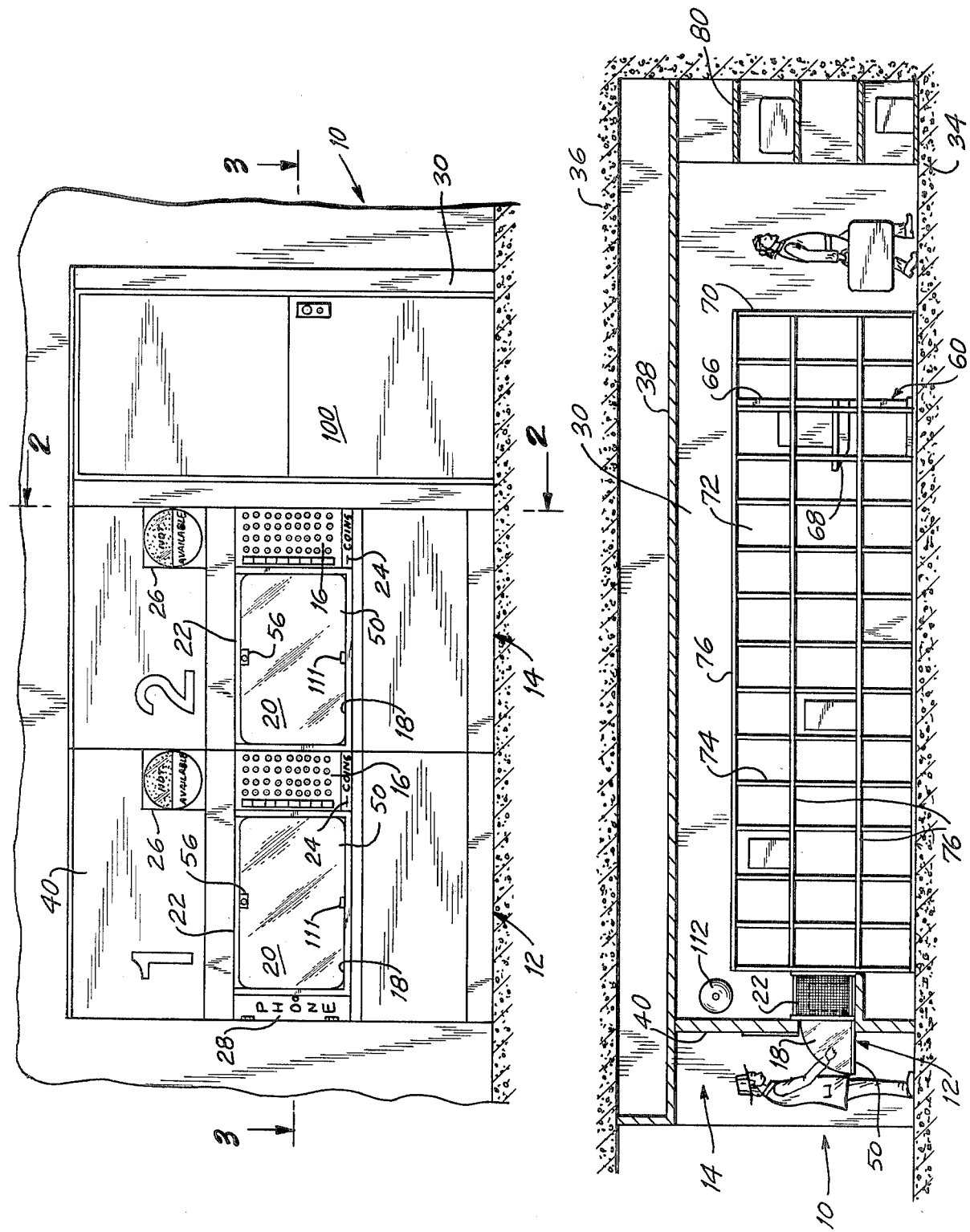

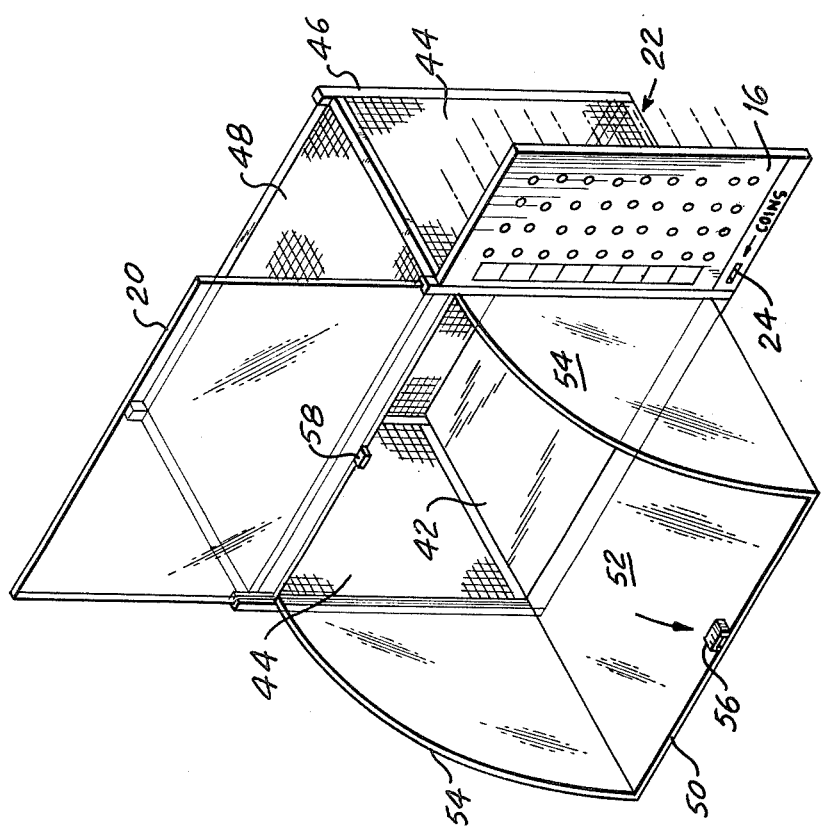
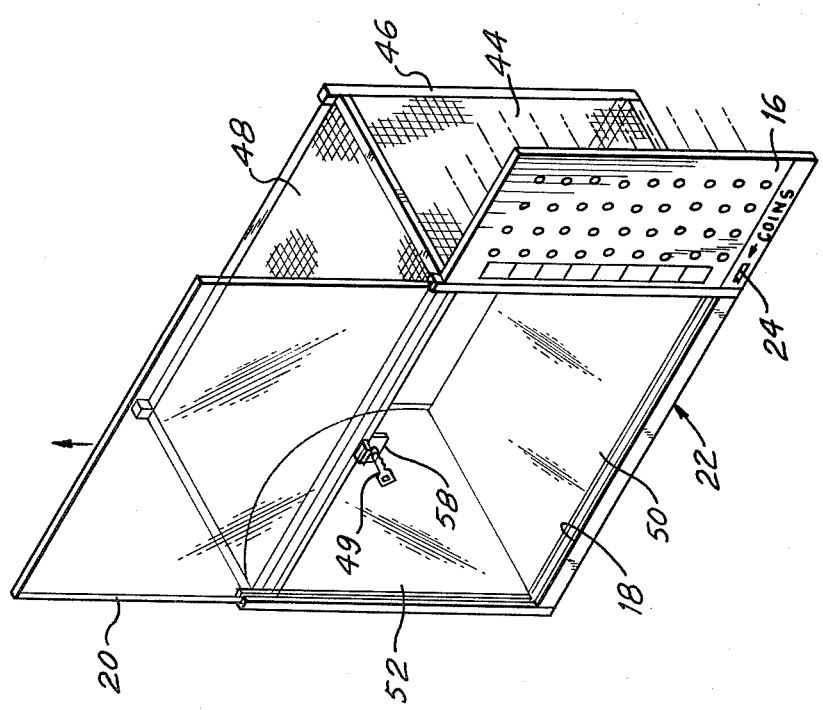

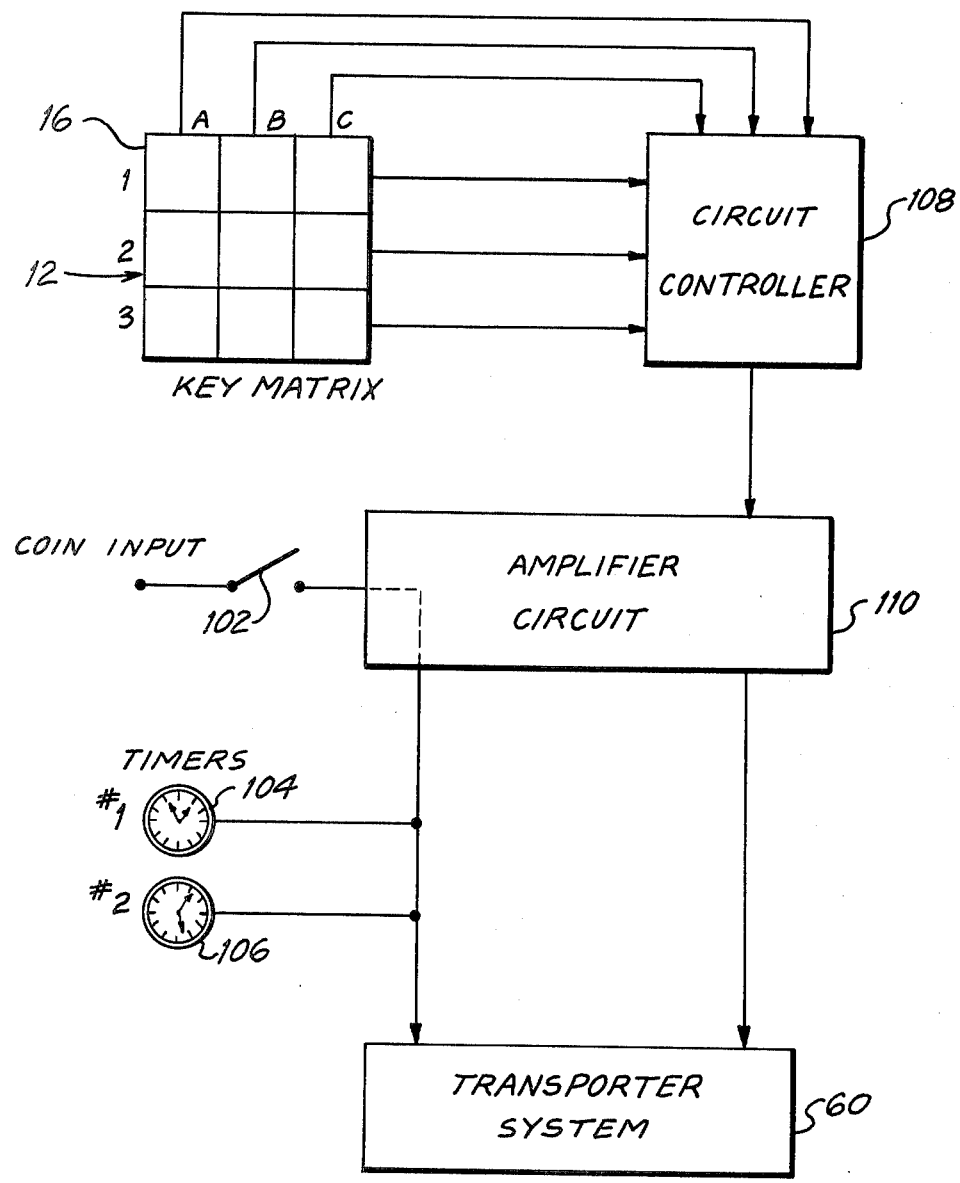

COIN AND KEY OPERATED STORAGE SYSTEM

The present invention relates to storage systems of the type used in public transportation terminals for temporary storage of articles such as luggage and the like and more particularly relates to automated storage systems to remove such checked articles from areas of high public concentration to a secure area.

Most terminals for public transportation such as railway, bus and airport terminals include provision for individuals to temporarily store articles such as luggage and the like. Such facilities typically are banks of coin-operated compartments in which the user deposits a coin, places his article in the compartment and locks it. For the convenience of the public these banks of storage compartments are readily accessible in areas of the terminal which have high public access. Recently, there have been incidents of explosive devices placed in such compartments which have detonated causing the steel compartments to fragment resulting in the death and serious injury of innocent bystanders. Operators of the terminals recognize the desirability of providing temporary storage facilities for use of the public. However, it has been recognized that the most desirable means of providing temporary storage facilities is such a storage facility which can be provided with sufficient safeguards to prevent needless injury to innocent bystanders in the event that explosive devices are placed in such storage facilities.

Accordingly, it is an object of the present invention to provide an automated storage facility which automatically transports checked luggage and the like from an access point readily available for the deposit of such articles to a remote secure location where the detonation of any explosive device would cause minimal injury.

It is a further object of the present invention to provide such an automated storage system which can be readily constructed in public transportation terminals and which will be relatively simple to operate.

It is a still further object of the present invention to provide such an automated storage facility which can automatically transport and retrieve luggage and the like checked by an individual and where the storage repository for such articles may be constructed of an explosive resistant construction.

In accordance with an aspect of the present invention, an automated storage system is provided which includes an access station for the deposit of articles desired to be temporarily stored. The articles are stored in a frangible container and are automatically transported from the access station to a predetermined, vented storage area. Upon initiation of the retrieval operation, the system automatically retrieves the checked article from its predetermined storage area and returns it to the access station for removal by the individual who checked the article.

The above, and other objects, features and advantages of this invention, will be apparent in the following detailed description of an illustrative embodiment which is to be read in connection with the accompanying drawings.

In the drawings:

FIG. 1 is a front elevational view of a typical access area of the automated storage facility of the present invention; FIG. 2 is an elevational view taken along line 2—2 of FIG. 1 showing the automated storage facility of the present invention;

FIG. 5 is a perspective view showing a baggage storage container in closed position at an access point with outer door open;

FIG. 6 is a view similar to FIG. 5 showing the storage container in an open position at an access point;

FIG. 8 is a diagrammatic representation of the control system for the automated storage facility of the present invention.

Figure 3:
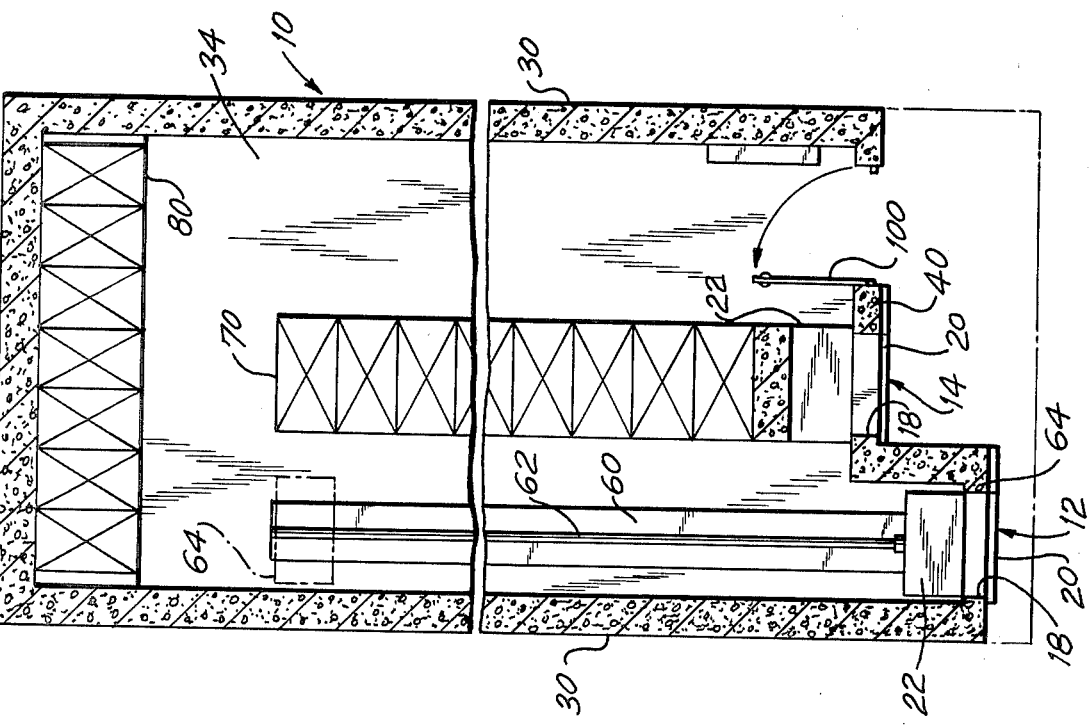
FIG. 3 is a plan view taken on line 3—3 of FIG. 1 showing the automated storage facility of the present invention.

With reference to the drawing and particularly FIGS. 1-3, an automated storage facility 10 is shown having two storage access stations 12 and 14. Each access station includes a key array panel 16 with each position on the key array panel being representative of a separate storage position, as will be explained more fully hereinbelow.

Each access station also includes an access opening 18 through which baggage or other articles to be checked may be deposited. A door 20 of a clear, hard, preferably bulletproof material is provided to close the access opening 18. Door 20 is made slidable with respect to the access opening 18 (see FIG. 5) to permit access to a storage container 22 which receives the baggage or the like to be checked.

Access stations 12 and 14 also include an appropriate coin slot 24 for the reception of coin to activate the system to make a storage facility available, indicating means 26 in the form of a lighted panel to indicate the availability or unavailability of a storage facility from that access station and at least one of the access stations is provided with a telephone instrument 28 for the user to call for assistance from an attendant should any problem arise with the system.

The storage facility is ideally housed within a structure of a strong and sturdy construction so as to be better able to withstand the blast effect in the event that any explosive is detonated within the storage facility 10. To this end, as seen in FIG. 3 as well, the automated storage facility is housed within a room having side walls 30 and a rear wall 32 of a blast resistant construction, such as concrete. Typically, the floors and ceilings 34 and 36, respectively, in transportation terminals are made of sufficient thicknesses to provide explosion resistance. In addition, a subceiling 38 over the storage facility 10 is also preferably provided for additional blast resistant protection. The front wall 40 of the storage facility 10 is also constructed of strong and sturdy material of sufficient strength to withstand explosive effect of any explosives detonated within the confines of the storage facility 10.

Articles such as luggage and the like to be stored in storage facility 10 are housed in individual storage containers 22 (see FIGS. 5 and 6) which are transported to a position adjacent access opening 18 whenever the system is activated for the deposit of the article or its retrieval. The containers 22 are constructed of a bottom plate 42, preferably of a heavy gauge steel and side, rear and top panels 44, 46 and 48, respectively, of a heavy gauge steel mesh. The front of each storage container 22 includes a pivoting access door 50 having a closure panel 52 and side panels 54. Door 50 is pivotally mounted at the front opening of the container 22 and pivotable from a first position shown in FIG. 5 to a second position shown in FIG. 6. A latching member 56 is included on the panel 52 for latching engagement with a latching element 58 positioned on the edge of the top panel 48 in order to secure the door member in the closed position. A key 49 is also provided to secure the latch.

Use of the mesh screen for the side, rear and top panels is advantageous from the standpoint of directing the blast effects from any explosive material detonated while in the container 22. The mesh screen allows any explosion to dissipate without rupturing the container itself causing fragments to be dispersed with great force and at a high velocity.

Referring now to FIGS. 2 and 3, a transport device 60 is shown associated with the access opening 18 to transport containers 22 to and from the access opening 18 and a preselected storage compartment. Transport device 60 includes a guide track 62 disposed along the floor 34 of the storage facility and a movable carriage assembly 64 movable along the guide track 62 from a first position shown in dotted line in FIG. 3 to the second position shown in full line adjacent access opening 18. Carriage assembly 64 includes an upstanding support 66 upon which is disposed a vertically movable platform 68. Platform 68 is also laterally movable toward and away from a storage assembly 70.

Storage assembly 70 is provided within the storage facility disposed adjacent to and parallel with the path of movement of movable carriage assembly 64 and is, in essence, a storage facility defining individual cubicles 72 for the reception and storage of the containers 22. Thus, a storage facility 70 may be constructed of open shelving comprising vertical support members 74 and horizontal support members 76 to define, for example, three horizontal rows of cubicles 72. Thus, the transport assembly 60 driven by a suitable electric motor (not shown) and responsive to predetermined signals can traverse the entire length of the track 62 with the platform 68 being elevatable and movable to deposit and retrieve a container 22 from any one of the individual storage cubicles 72 defined by the storage facility 70. Each of the individual cubicles 72 is coded in a predetermined manner so that precise selection of a particular cubicle 72 can be determined, as will be explained more fully hereinbelow. As shown in FIG. 3, one transport assembly 60 may service stations 12 and 14 as the transport can bring a container 22 to, and retrieve from, either access station.

As is customary with locked storage systems of this type, the rental of a storage facility is for a definite time limit, for example, twenty-four hours. If articles are not retrieved within that twenty-four hour span, operators of the transportation terminals empty the lockers and store any article left beyond the twenty-four hour time limit in other locations so as to free storage space for the convenience of travelers.

The present system is adaptable to that type of operation in that provision is made at the rear of the storage facility 10 for the retention of articles checked beyond the specified time period. Accordingly, storage shelving 80 is provided at the rear of the storage facility 10 where an attendant may place containers 22 which remain unclaimed after the predetermined rental period. To determine the expiration of the rental period the system is provided with a timing mechanism, as will be described more fully hereinbelow, which provides an indication as to the elapsed time a particular storage facility has remained in use. Thus, after the elapsed time an attendant may remove a storage container 22 from the automated storage facility 70 and place it in storage facility 80. Retrieval of any articles left in the storage facility 80 may be had by use of the telephone 28 which connects the user with an attendant for personal service.

Figure 4:
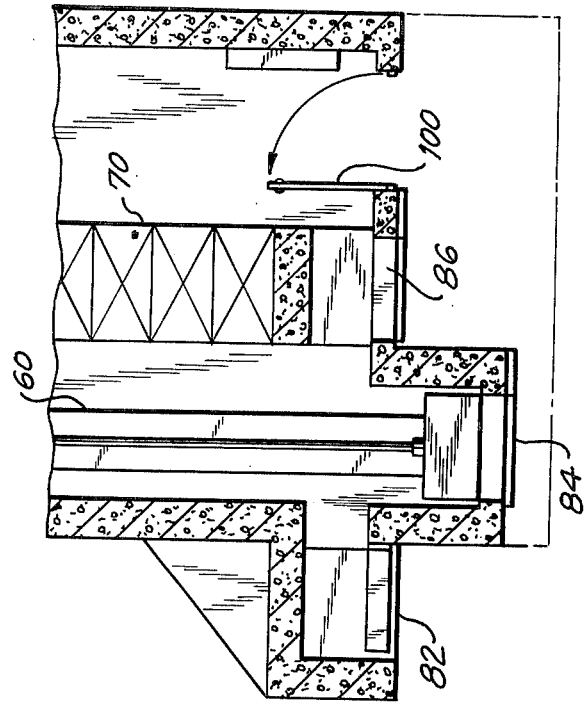
FIG. 4 is a plan view of an alternative embodiment of the present invention showing three access doors for the deposit of stored articles used in conjunction with one transporter means.
Figure 7:
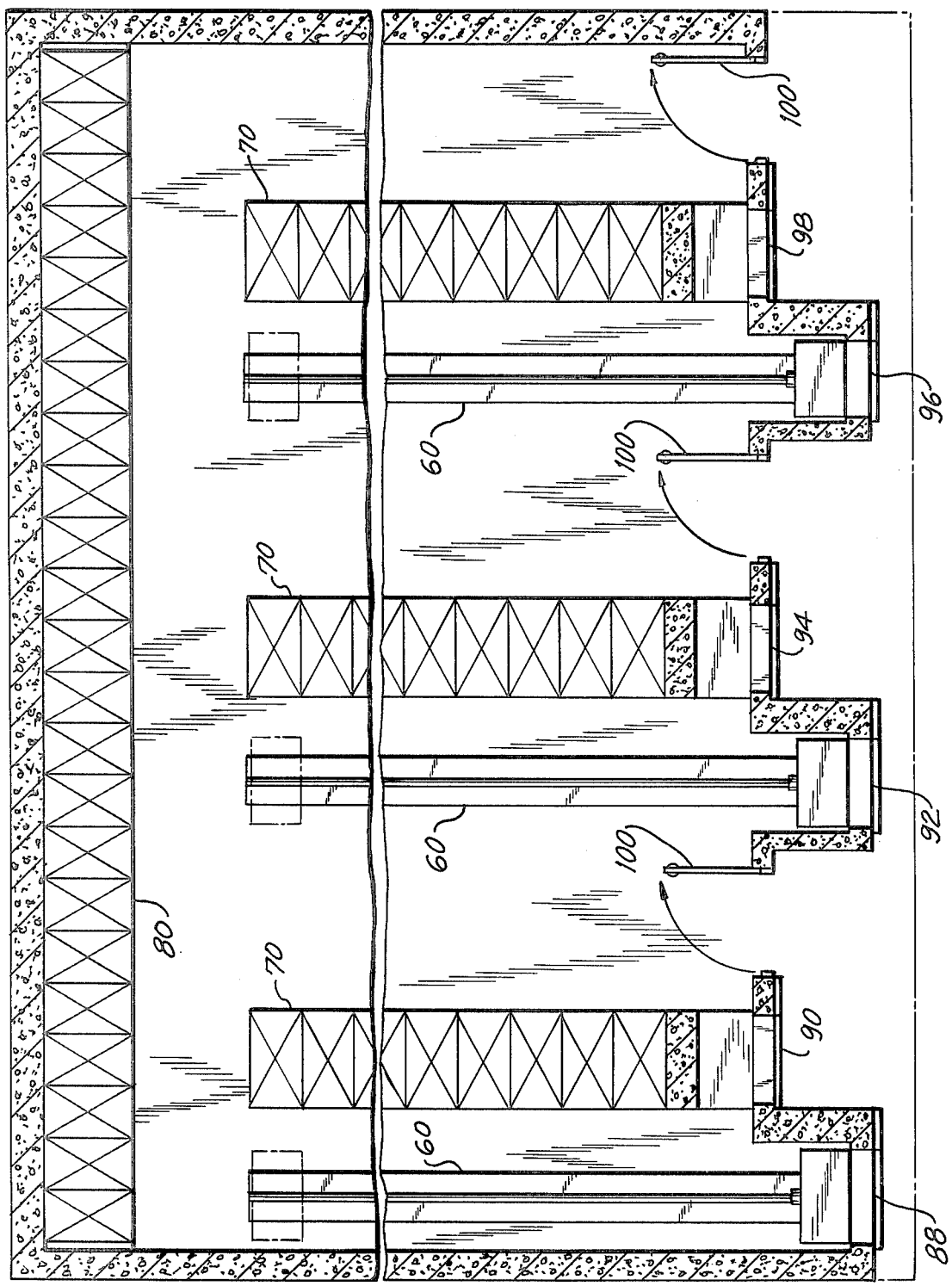
FIG. 7 is a plan view showing an alternate arrangement for the automated storage system of the present invention.

FIGS. 4 and 7 show various arrangements for storage which may be utilized with the present invention. In FIG. 4 an arrangement is shown where three access stations 82, 84 and 86 are serviced by a single transport assembly 60 since the transport assembly 60 can service the access stations 82 and 86 disposed on either side of the transport system as well as the access station 84 directly in line with the path of movement of the transport system 60. FIG. 7 shows a multiple access station, multiple transport system arrangement where three separate transport systems 60 and automated storage facilities 70 service three two-access stations 88–90, 92–94 and 96–98, respectively. In each of these embodiments, personnel access is provided through a door 100 which is preferably made of a high strength material so as to withstand any blast effects due to detonation of an explosive device within the storage facility. In other embodiments the door may be a double-opening door having two separately openable and lockable halves.

The automated storage facility operates as follows. When a patron arrives at an access station 12, the indicator 26 will provide information as to whether one of the storage containers 22 is available for use. If one is available insertion of the appropriate coin in the coin slot 24 will close a switch 102 (FIG. 8) in the system control circuit to initiate movement of the transporter 60 to an empty container 22 in the storage facility 70. The appropriate container is transported to the access opening 18. As soon as a container arrives at the access opening 18, the door 20 opens automatically allowing the patron to place an article in the container. To do this the patron turns key 49 opening door 50 and places the article within the container. After closing and locking the container with key 49 the patron keeps the key as a receipt which permits him to retrieve his belongings.

Timers 104 and 106 in the system are activated during the process. Timer 104 provides a short delay of sufficient duration to permit completion of the article checking procedure before initiating the removal of the container 22 from the access station to its predetermined storage cubicle 72. Timer 106 is activated as well and provides a running time for the predetermined permissible rental time, for example twenty-four hours, to provide attendant personnel with an indication of when any article has been left for longer than the permissible time so that the particular container can be moved to storage facility 80. To accomplish this for each of the various containers, the system is of course provided with a timer 106 for each container.

After door 50 is closed with the key 49 removed, and after the elapsed time, as set by timer 104, door 20 is closed and container 22 is transported and deposited in its predetermined cubicle 72.

To retrieve articles from facility 10, the patron returns to the same access station and inserts the key 49 into the correct key receptacle in key matrix 16. Key matrix 16 is coded with each matrix representing a particular storage cubicle 72, which of course, correlates to the container 22 stored therein which may be opened by the particular key 49. Thus insertion of the proper key 49 in its proper key matrix, for example matrix position A-2, will initiate a signal to circuit controller 108. Controller 108 illustratively may include a terminal strip with a terminal post for each matrix position, or it may comprise a microprocessor, as is known in the art. Controller 108 sends a signal through a signal amplifier 110, if controller 108 is a microprocessor, to the transporter 60 which then moves to the proper cubicle 72 to retrieve container 22 and transport it to the access opening 18. With the arrival of the container 22 at access opening 18, door 20 opens. Upon the opening of door 20 the patron removes key 49 from matrix panel 16, opens door 50 and retrieves the article stored in the container. The key 49 remains with container 22. After the predetermined time interval set on timer 104 has elapsed, the container at access opening 18 is returned to its proper cubicle 72.

As an additional precautionary measure, the automated storage system of the present invention may include explosive detection means 111 positioned adjacent each access opening 18 which is activated by the circuit for timer 104. Such detection means, for example ion detectors, are known in the art and are capable of sensing the presence of certain types of explosive devices. Such detection means are connected to a suitable alarm 112 to alert attendant personnel to the presence of explosive material deposited in a container 22 so that appropriate precautionary measures may be instituted.

It is thus seen that the present invention provides a system for the temporary storage of articles removed from any areas of a public place so as to insure the safety of the public from the dangers of explosive devices which may be placed in a public checking facility.

What is claimed is:

1. An automated storage facility for the temporary storage of articles comprising:
    an access station for the deposit and retrieval of articles to be stored, said access station including an access opening therein and a door member slidably disposed with respect to said access opening,
    a plurality of storage facilities arranged in a bank at a location remote from said access station, said plurality of storage facilities comprising an array of storage cubicles arranged in a plurality of tiers one atop another along a row,
    a plurality of containers, one for each of said storage cubicles, each of said containers including a door closure member movable from a first closed position to a second open position, a lock device on said door closure member and a key member removably disposed in said lock device for locking and unlocking said door,
    transport means movable to and between a position adjacent said access station and a position removed from said access station along a path adjacent to and parallel with the row of storage cubicles,
    said transport means including a platform adaptable to receive said containers and transport the same from said storage cubicles to a position adjacent said access station, said platform being elevatable between a plurality of positions and being movable laterally with respect to the path of movement of said transport means so as to be adapted to deposit and retrieve said containers from preselected ones of said storage cubicles,
    control means located adjacent said access station and electrically connected to said transport means and operable to select one of a plurality of said containers available to receive said articles to be stored,
    coin receiving means mounted at said access station, and
    switch means connected to said coin receiving means and said control means and responsive to the deposit of a coin in said coin receiving means for actuating said transport means to transport said selected one of said containers to said access station,
    said access station including a matrix system and a circuit controller electrically connected to said control means, said matrix system having a plurality of key insert positions with each said key insert position corresponding to a separate one of said plurality of storage cubicles and being arranged to receive a corresponding said key member, the insertion of the proper said key member in said matrix system actuating said control means to initiate retrieval of the container corresponding to said inserted key member and transport of said container to said access station.

2. An automated storage facility as defined in claim 1 wherein said plurality of storage facilities arranged in a bank comprise an array of storage cubicles arranged in a plurality of tiers one atop another along a row disposed adjacent to and parallel with the path of movement of said transport means.

3. An automated storage facility as defined in claim 1, which further comprises means at said remote location for containing the blast effect of any explosive device detonated in one of said containers at said location.

4. An automated storage facility for the temporary storage of articles comprising:
    an access station for the deposit and retrieval of articles to be stored, said access station including an access opening therein and a door member slidably disposed with respect to said access opening,
    a plurality of storage facilities arranged in a bank at a location remote from said access station, said plurality of storage facilities arranged in a bank comprising an array of storage cubicles arranged in a plurality of tiers one atop another along a row,
    a plurality of containers, one for each of said storage cubicles, each of said containers comprising a boxlike structure having a plurality of the sides constructed of a mesh material thereby to dissipate the blast effect of any explosive device detonated therein and a door closure member pivotally movable from a first closed position to a second open position, each said container including a lock device associated with said door closure member and having a key member for operating said device,
    transport means movable to and between a position adjacent said access station and a position removed from said access station along a path adjacent to and parallel with the row of storage cubicles,
    said transport means including a platform adaptable to receive said containers and transport the same from said storage cubicles to a position adjacent said access station, said platform being elevatable between a plurality of positions and being movable laterally with respect to the path of movement of said transport means so as to be adapted to deposit and retrieve said containers from preselected ones of said storage cubicles, control means located adjacent said access station and electrically connected to said transport means and operable to select one of a plurality of said containers available to receive said articles to be stored, coin receiving means at said access station, and switch means connected to said control means and responsive to the deposit of a coin in said coin receiving means for actuating said transport means to transport said selected one of said containers to said access station, said access station including a key matrix system electrically connected to said control means and having a plurality of key insert positions with each said key insert position being correlated to a separate one of said plurality of storage cubicles whereby insertion of the proper one of a said key member in said key insert matrix actuates said control means to initiate retrieval of the container corresponding to said inserted key member and transport of said container to said access station.

5. An automated storage facility as defined in claim 4 including timer means associated with said control means to initiate transport of a container from said access station after a predetermined interval of elapsed time.

* * * * *